(12) United States Patent
Elliott et al.

(10) Patent No.: US 6,438,941 B1
(45) Date of Patent: Aug. 27, 2002

(54) BIFURCATED SPLITTER FOR VARIABLE BLEED FLOW

(75) Inventors: Dale Bradley Elliott, Lawrenceburg, IN (US); Peter Nicholas Szucs, West Chester, OH (US); Nicholas Damlis, Cincinnati, OH (US); Kenneth Paul Onderko, Hamilton, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/843,565

(22) Filed: Apr. 26, 2001

(51) Int. Cl.⁷ .................................................. F02K 3/02
(52) U.S. Cl. ......................... 60/226.1; 60/785; 60/795
(58) Field of Search ............................. 60/226.1, 785, 60/795

(56) References Cited

U.S. PATENT DOCUMENTS

| | | |
|---|---|---|
| 3,142,438 A | 7/1964 | McKenzie |
| 3,494,129 A | 2/1970 | Krebs et al. |
| 3,528,246 A | 9/1970 | Fischer |
| 3,632,223 A | 1/1972 | Hampton |
| 3,735,593 A | 5/1973 | Howell |
| 3,797,527 A * | 3/1974 | Bain .......................... 137/832 |
| 4,052,845 A | 10/1977 | Tumavicus |
| 4,055,946 A | 11/1977 | Sens |
| 4,068,471 A | 1/1978 | Simmons |
| 5,155,993 A | 10/1992 | Baughman et al. |
| 5,184,461 A | 2/1993 | Stransky et al. |
| 5,201,801 A | 4/1993 | Smith, Jr. |
| 5,404,713 A | 4/1995 | Johnson |
| 5,485,717 A * | 1/1996 | Williams .................... 60/226.1 |
| 5,680,754 A | 10/1997 | Giffin et al. |
| 5,809,772 A | 9/1998 | Giffin, III et al. |
| 5,996,336 A * | 12/1999 | Hamedani ................... 60/226.1 |
| 6,109,868 A | 8/2000 | Bulman et al. |

* cited by examiner

Primary Examiner—Charles G. Freay
Assistant Examiner—J F Belena
(74) Attorney, Agent, or Firm—Rodney M. Young; Steven J. Rosen

(57) ABSTRACT

An air bleed assembly for extracting air from a flowpath in a gas turbine engine includes a casing for surrounding a row of circumferentially spaced apart rotor blades and defining at least in part the flowpath for receiving air compressed by the rotor blades. The casing includes a bleed port disposed downstream of a row of the blades for receiving a portion of the compressed air as bleed airflow and a bleed duct extending away from the bleed port. The bleed duct has an annular slot in the casing. The annular slot has annular slot leading and trailing edges and an annular bifurcated splitter disposed along at least a portion of the annular slot trailing edge. The bifurcated splitter has an annular leading edge forebody located upstream of and separated from an annular splitter wall by an annular return channel. In one embodiment of the invention, the rotor blades are fan blades and the annular bleed space is in the flowpath in a fan section of the engine. The annular bleed space is located between a fan variable vane disposed across the flowpath and one of the fan blades located downstream of the fan variable vane.

27 Claims, 4 Drawing Sheets

BIFURCATED SPLITTER FOR VARIABLE BLEED FLOW

BACKGROUND OF THE INVENTION

1. Field of the Invention

This invention relates generally to bleeding air from a fan or compressor of gas turbine engines and, more particularly, to bleeding a wide range of variable fraction of air from a fan or compressor of a gas turbine engine.

2. Discussion of the Background Art

Bypass gas turbine engines typically include an axial flow fan and a high pressure compressor which supplies high pressure air to a combustor. The fan and compressor typically includes multiple stages. Each stage is composed of a stationary component referred to as a stator and a rotational component, which adds work to the system, referred to as a rotor. A portion of compressed interstage air may be extracted from either component for turbine section cooling, airframe pressurization, anti-icing, and other uses.

Conventional bleed systems extract a relatively small and relatively fixed fraction of fan or compressor air through bleed openings between stator vanes. The fan and/or compressor stages downstream of the bleed openings are accordingly sized and designed to minimize performance penalty to an engine cycle. There is a need to provide a bleed system for efficiently supplying a large variable amount of bleed air at various flight conditions while minimizing performance penalty to an engine cycle. In a non complementary manner, the bleed system has to be sized and designed for a maximum bleed air flow requirement and the fan and/or compressor sections downstream of the bleed openings have to be sized to accept 100 percent fan flow with little or no bleed flow being extracted.

Therefore, it is desirable to provide for bleeding or extraction of a variable percentage of interstage fan air at various flight conditions, with little or no adverse performance effect or performance penalty to an engine cycle.

SUMMARY OF THE INVENTION

An air bleed assembly for extracting air from a flowpath in a gas turbine engine includes a casing for surrounding a row of circumferentially spaced apart rotor blades and defining the flowpath for receiving air compressed by the rotor blades. The casing includes a bleed port disposed downstream of a row of the blades for receiving a portion of the compressed air as bleed airflow and a bleed duct extending away from the bleed port. The bleed duct has an annular slot in the casing. The annular slot has annular slot leading and trailing edges and an annular bifurcated splitter disposed along at least a portion of the annular slot trailing edge. The bifurcated splitter has an annular leading edge forebody located upstream of and separated from an annular splitter wall by an annular return channel.

In the exemplary embodiment of the invention, the leading edge forebody has an airfoil shaped cross-section with a radially outwardly facing suction side and a radially inwardly facing pressure side. The leading edge forebody is an annular ring and the splitter wall has a blunted leading edge annularly bounding return channel. The leading edge forebody is supported by support vanes extending through at least a portion of the bleed duct. Channel vanes extend through the bleed duct aft of the support vanes. At least one bleed plenum is in fluid communication with the bleed duct and first and second bleed air circuits are in downstream fluid communication with the bleed plenum. First and second control valves are disposed in the bleed circuits downstream of the plenum. An annular bleed space in the flowpath is located between a vane, that may be variable, disposed across the flowpath and one of the rotor blades located downstream of the variable vane. The annular slot and the annular bifurcated splitter are located along the annular bleed space.

In a more particular embodiment of the invention, the rotor blades are fan blades and the annular bleed space is in the flowpath in a fan section of the engine. The annular bleed space is located between a fan variable vane disposed across the flowpath and one of the fan blades located downstream of the fan variable vane.

DETAILED DESCRIPTION

Figure 1:
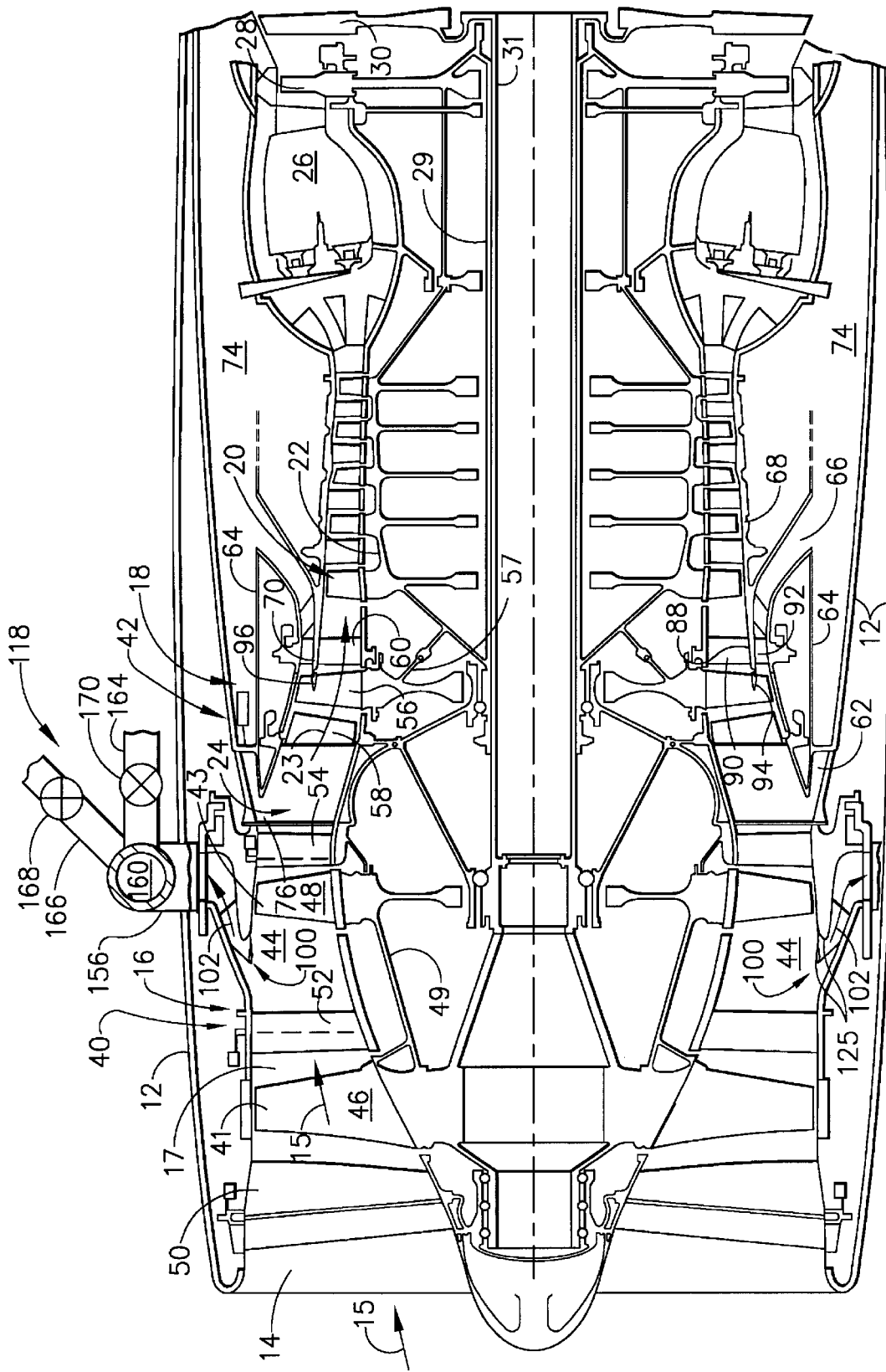
FIG. 1 is a cross-sectional view illustration of an exemplary multistage fan, double-bypass variable cycle engine with a bleed port and bifurcated splitter of the present invention.

Illustrated in FIG. 1 is an exemplary of a variable cycle engine 10, such as a split fan, double-bypass variable cycle engine that is commonly known in the art such as the one described in U.S. Pat. No. 5,680,754 which is assigned to the same assignee as the present invention and which is incorporated herein by reference. The variable cycle engine 10 includes an outer casing or nacelle 12 having an inlet 14 at an upstream end of the nacelle. Disposed within the inlet 14 is a fan 16 to provide an airflow 15 to the engine 10 through a fan flowpath 17. Downstream of the fan 16 is a core engine 18 which includes an axial flow compressor 20 having a core rotor 22. Pressurized air 23 from the fan 16 enters the core engine 18 at a compressor inlet 24 and is further compressed and discharged to a combustor 26. Fuel is burned in the combustor 26 to provide high energy combustion gases which drive a core engine turbine 28. The core engine turbine 28, in turn, drives the core rotor 22 through a core engine shaft 29. The combustion gases then flow to and drive a fan turbine 30 which, in turn, drives the fan 16 through a fan shaft 31.

The fan 16 includes a first or forward fan section 40 axially displaced from and forward of a second or aft core driven fan section 42. Core driven fan sections are well known in the art. The forward fan section 40 is a two stage fan section having a forward fan stage 41 axially displaced from and forward of an aft fan stage 43. The forward and aft fan stages 41 and 43 are axially separated by an axial space 44. The forward fan stage 41 includes a row of forward fan blades 46 which are circumferentially spaced apart about a fan rotor 49. The aft fan stage 43 includes a row of aft fan blades 48 which are circumferentially spaced apart about the fan rotor 49. Forward of the forward fan blades 46, at the inlet 14, is a row of variable inlet guide vanes 50. Aft of the forward fan blades 46 is a row of forward stator vanes 52 that may be fixed or variable as illustrated in the exemplary embodiment of the invention. Aft of the aft fan blades 48 is a row of variable aft stator vanes 54. The aft fan section 42 is a single stage fan having a row of rotor blades 56 circumferentially spaced apart about a second fan rotor 57 driven by the core engine shaft 29. The rotor blades 56 are spaced between rows of variable stator vanes 58 and 60.

Two concentric bypass duct inlets are used to bypass a portion of the airflow from the fan 16 around the core engine 18. A first bypass duct inlet 62 is between the outer casing 12 and an intermediate casing 64. A second bypass duct inlet 66 between the intermediate casing 64 and an inner casing 68, which houses the core engine 18. The airflow compressed by the second fan section 42 is divided between the second bypass duct inlet 66 and the inlet 24 to the core engine 18 by an upstream splitter 70 as illustrated in FIG. 1. At the downstream end of the intermediate casing 64, the first bypass duct inlet 62 and second bypass duct inlet 66 merge into a common bypass duct 74.

Figure 2:
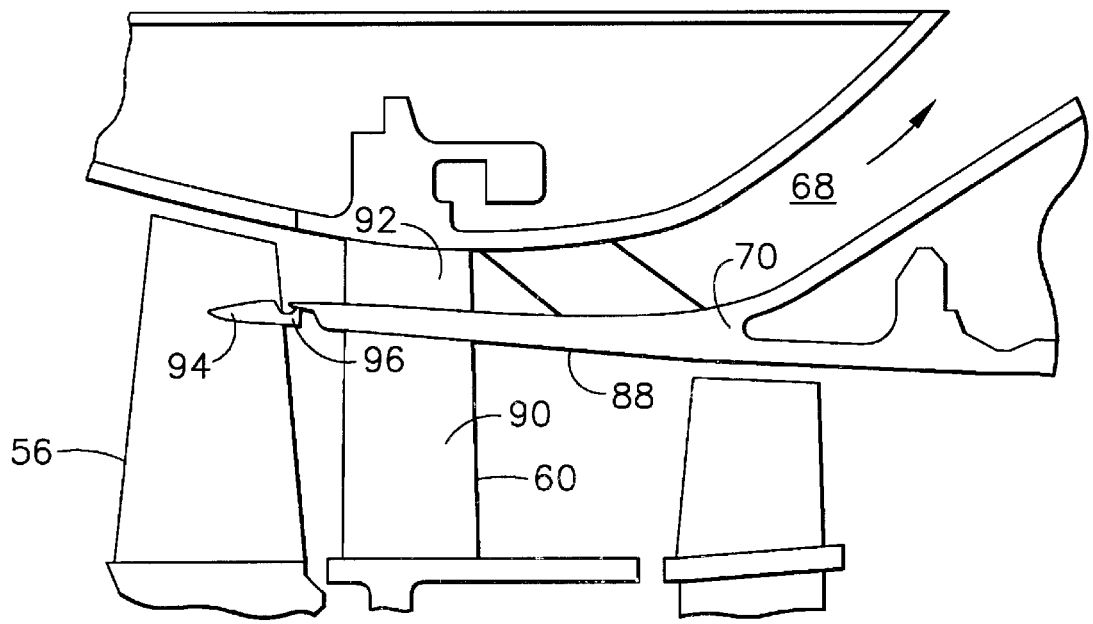
FIG. 2 is an enlarged cross-sectional view illustration of a second bypass duct inlet and its splitter in the engine in FIG. 1.

A forward variable area bypass injector (VABI) 76 is used to increase the effective bypass ratio of the engine. The forward VABI 76 is associated with the intermediate casing 64, which separates the first bypass duct inlet 62 from the second bypass duct inlet 66. The forward VABI 76 includes a variable geometry flow device, such as a double-bypass selector valve not illustrated herein. A selector valve is illustrated as a translating valve type in U.S. Pat. No. 4,175,384. Further referring to FIG. 2, the splitter 70 has an extension 88 near the trailing edge of the second fan section 42. The extension 88 extends into the second fan section 42 and divides the stator vane 60 into an inner stator vane 90 and an outer stator vane 92. A forward portion 94 of the extension 88 is attached to the rotor blade 56 and has a rear or aft portion 96 to form a seal with the remainder of the extension 88. The forward portion 94 is attached to the blade 56 such as to form an annulus or shroud. This type of variable cycle engine is described in U.S. Pat. No. 5,680,754.

Referring to FIG. 1, the invention provides an air bleed assembly 100 for extracting compressed air 102 from a flowpath in a gas turbine engine. The invention is illustrated for the exemplary engine 10 as extracting compressed air 102 from the fan flowpath 17. In general, the compressed air 102 is extracted through the casing 12 which surrounds a row of circumferentially spaced apart rotor blades exemplified by the forward fan blades 46, for receiving air compressed by the rotor blades and which defines the flowpath 17. Further referring to FIGS. 3 and 4, the casing 12 has a bleed port 108 disposed downstream of the forward fan blades 46. The bleed port 108 is designed for receiving a portion of the compressed airflow 15 which passes through the forward fan blades 46. The bleed port 108 is illustrated herein located along the axial space 44 between the forward and aft fan stages 41 and 43. The portion in the exemplary embodiment of the invention illustrated herein is used as bleed airflow 110 and a bleed duct 112 extends away from the bleed port 108 and is used to direct the bleed airflow to a bleed flow manifold system 118 illustrated in FIG. 1.

Figure 3:
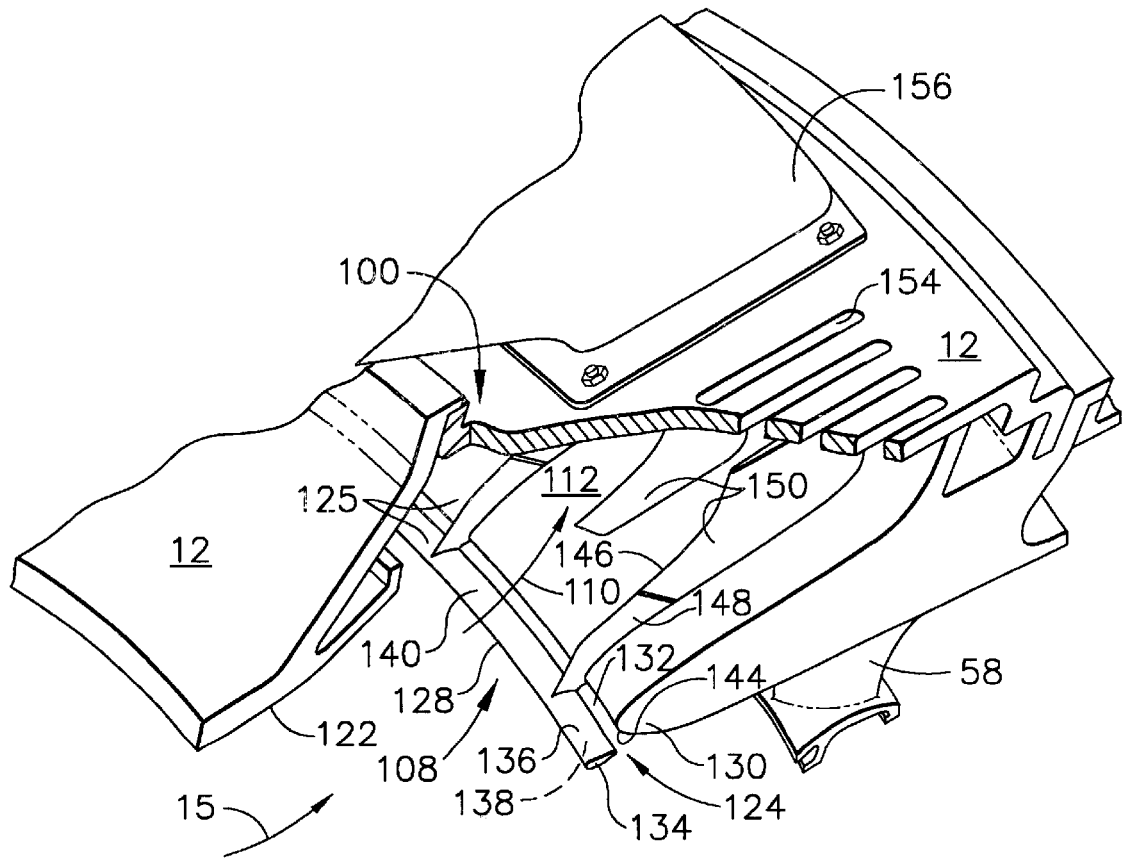
FIG. 3 is a perspective view illustration of the bleed port and the bifurcated splitter in FIG. 1.
Figure 4:
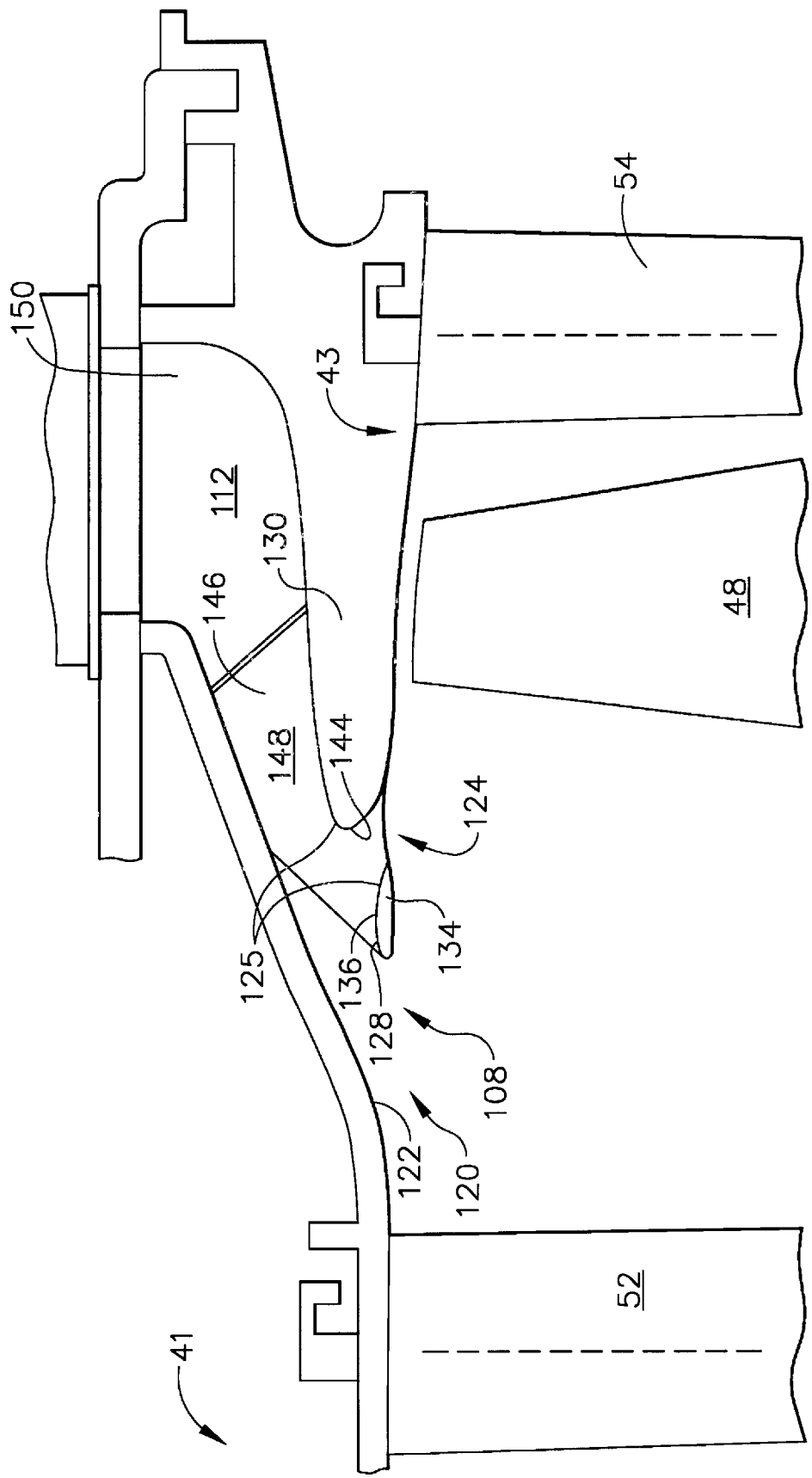
FIG. 4 is an enlarged cross-sectional view illustration of the bleed port and the bifurcated splitter in FIG. 1.

As illustrated in FIGS. 3 and 4, the bleed port 108 and the bleed duct 112 has an annular slot 120 in the casing 12. The annular slot 120 has annular slot leading and trailing edges 122 and 124, respectively, and an annular bifurcated splitter 125 disposed along at least a portion of the annular slot trailing edge 124. The bifurcated splitter 125 has an annular leading edge forebody 128 located upstream of and separated from an annular splitter wall 130 by an annular return channel 132. In the exemplary embodiment of the invention, the leading edge forebody 128 has an airfoil shaped cross-section 134 with a radially outwardly facing suction side 136 and a radially inwardly facing pressure side 138. The leading edge forebody 128 is an annular ring 140 and the splitter wall 130 has an annular blunted leading edge 144 bounding return channel 132. The leading edge forebody 128 is supported by support vanes 146 extending through at least a portion 148 of the bleed duct. Channel vanes 150 extend through the bleed duct 112 aft of the support vanes 146 and are used to discourage and prevent circumferential crossbows in the bleed duct due to circumferential pressure distortion. They also discourage noise and aeromechanical instabilities by dividing the bleed annulus volume into smaller, discrete passages. Aft portions of the vanes can he preferentially leaned to best direct the bleed flow into whatever collection manifolds or plenums are employed outside the fan case such as manifold volutes 156 described below.

Slots 154 through the outer casing 12 admit the bleed airflow 110 into manifold volutes 156 that feed into at least one bleed plenum 160 that is illustrated in FIG. 1 and which may be in the form of an annular manifold pipe disposed around the engine 10 or outer casing 12. The bleed plenum 160 is in fluid communication with the bleed ducts and first and second bleed air circuits 164 and 166, respectively, are in downstream fluid communication with the bleed plenum. First and second control valves 170 and 168 respectively, are disposed in the first and second bleed air circuits 164 and 166, respectively, downstream of the bleed plenum 160. The first and second bleed air circuits 164 and 166, respectively, are particularly useful for cooling one or more devices external to the engine 100.

Figure 5:
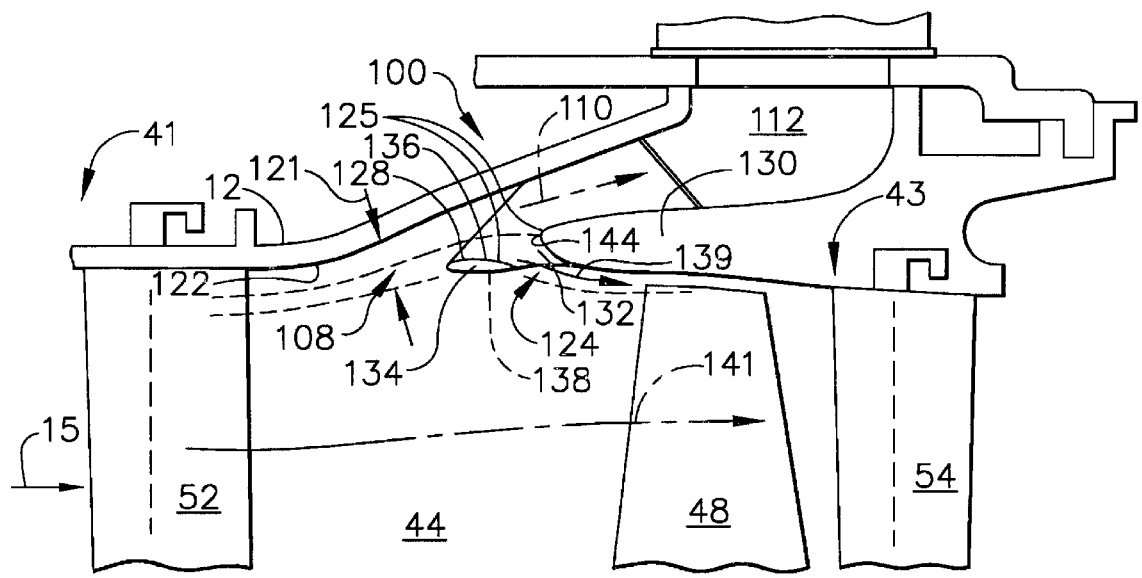
FIG. 5 is a cross-sectional view schematic illustration of the multistage fan section and bifurcated splitter in FIG. 3 illustrating operation of the bifurcated splitter during low bleed demand.

Illustrated in FIG. 5 is a first operational mode of the bifurcated splitter during low bleed demand. The bleed duct annulus area 121 of the annular slot 120 between the annular slot leading and trailing edges 122 and 124 is larger than required for an amount of the bleed airflow 110 needed. Without the bifurcated splitter 125, this would tend to cause premature flow separation with resultant regions of stagnant flow and vortex shedding affecting the performance and stability of tips of the downstream aft fan blades 48. The bifurcated splitter 125 and the annular leading edge forebody 128 and the annular return channel 132 counteract this tendency by locally increasing blockage, isolating and turning the bleed airflow 110 from the freestream airflow 15 and inducing a portion 139 of the bleed airflow not required for bleed to re-enter the compressor freestream flow 141. The annular blunted leading edge 144 and the return channel 132 are contoured to help the portion 139 of the bleed airflow 110 that re-enters the compressor freestream flow 141 to remain attached and distortion-free back to the tips of the downstream aft fan blades 48.

Figure 6:
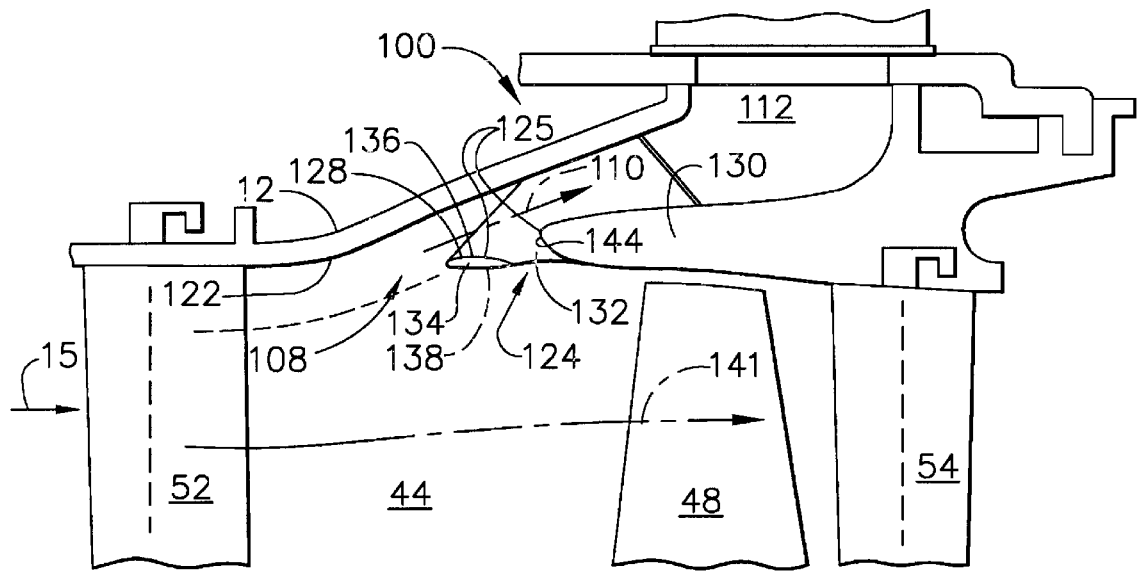
FIG. 6 is a cross-sectional view schematic illustration of the multistage fan section and bifurcated splitter in FIG. 3 illustrating operation of the bifurcated splitter during high bleed demand.

Illustrated in FIG. 6 is a second operational mode of the bifurcated splitter 125 during higher bleed demand. At higher bleed demand the bleed duct 112 operates closer to its design flow condition but the stage matching of the fan can be considerably altered. The downstream row of aft fan blades 48 of the aft fan stage 43 react to the diversion of flow for bleed by trying to pull more flow through the upstream stage(s) such as the forward fan blades 46. The upstream stage is thus unthrottled forcing the downstream stage to throttle up to maintain the pumping demand. In addition to lowering the source pressure for the bleed, during an extreme operating condition the upstream stage could be choked and the downstream stage could stall. The degree of stage mismatch and the reduced bleed pressure are the root causes of performance and stability difficulties that can arise. The problem is generally addressed by making the interstage stator row such as the forward stator vanes 52 variable so that stator vanes can be closed by opening the bleed in order to preserve the bleed source pressure and the loading balance between the stages. The variable stator is used in the exemplary embodiment of the present invention also but the larger range of bleed flows demanded are greater than what can be accommodated by the variable stator alone.

Without the bifurcated splitter, the axial velocity profile level approaching the downstream blades tends to be further reduced by the increased radial component of velocity of the freestream flow 141 represented in design by increased streamline curvature. The bifurcated splitter 125 acts to reduce the extent of this radial migration of the freestream flow 141 by locally increasing blockage and isolating the freestream flow 141 from the bleed airflow 110. In addition, flow reintroduced into the freestream flow 141 through the annular return channel 132 is accelerated following the inner contour of the return channel and leading edge 144 which helps energize the Freestream. rip flow. Both these help reduce the level of swirl perturbation and flow non-uniformity experienced by tile downstream stage tip.

The present invention has been described in an illustrative manner. It is to be understood that the terminology which has been used is intended to be in the nature of words of description rather than of limitation. While there have been described herein, what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

What is claimed is:

1. An air bleed assembly for extracting air from a flowpath in a gas turbine engine, said assembly comprising:
    a casing for surrounding a row of circumferentially spaced apart rotor blades and which at least in part defines the flowpath for receiving air compressed by said rotor blades,
    said casing including a bleed port disposed downstream of a row of said blades for receiving a portion of said compressed air as bleed airflow,
    a bleed duct extending away from said bleed port,
    said bleed duct including an annular slot in said casing and an annular bifurcated splitter, and
    said bifurcated splitter having an annular leading edge forebody located upstream of and separated from an annular splitter wall by an annular return channel.

2. An assembly as claimed in claim 1 wherein said leading edge forebody has an airfoil shaped cross-section with a radially outwardly facing suction side and a radially inwardly facing pressure side.

3. An assembly as claimed in claim 2 wherein said leading edge forebody is an annular ring.

4. An assembly as claimed in claim 2 wherein said splitter wall has an annular blunted leading edge bounding return channel.

5. An assembly as claimed in claim 2 wherein said leading edge forebody is supported by support vanes extending through at least a portion of said bleed duct.

6. An assembly as claimed in claim 1 further comprising at least one bleed plenum in fluid communication with said bleed duct and first and second bleed air circuits in downstream fluid communication with said bleed plenum.

7. An assembly as claimed in claim 6 further comprising a first and second control valves disposed in said bleed circuits downstream of said plenum.

8. An assembly as claimed in claim 7 further comprising:
    an annular bleed space in said flowpath,
    said annular bleed space located between a variable vane disposed across said flowpath and one of said rotor blades located downstream of said variable vane, and
    said annular slot and said annular bifurcated splitter located along said annular bleed space.

9. An assembly as claimed in claim 8 wherein said leading edge forebody has an airfoil shaped cross-section with a radially outwardly facing suction side and a radially inwardly facing pressure side.

10. An assembly as claimed in claim 9 wherein said leading edge forebody is an annular ring.

11. An assembly as claimed in claim 9 wherein said splitter wall has an annular blunted leading edge bounding return channel.

12. An assembly as claimed in claim 9 wherein said leading edge forebody is supported by support vanes extending through at least a portion of said bleed duct.

13. An assembly as claimed in claim 7 wherein said rotor blades are fan blades and the assembly further comprises:
    an annular bleed space in said flowpath in a fan section of the engine,
    said annular bleed space located between a fan variable vane disposed across said flowpath and one of said fan blades located downstream of said fan variable vane, and
    said annular slot and said annular bifurcated splitter located along said annular bleed space.

14. An assembly as claimed in claim 13 wherein said leading edge forebody has an airfoil shaped cross-section with a radially outwardly facing suction side and a radially inwardly facing pressure side.

15. An assembly as claimed in claim 14 wherein said leading edge forebody is an annular ring.

16. An assembly as claimed in claim 15 wherein said leading edge forebody is supported by support vanes extending through at least a portion of said bleed duct.

17. A gas turbine engine fan assembly, said assembly comprising:
    forward and aft fan stages axially separated by an axial space,
    said forward fan stage including a row of a forward fan blades which are circumferentially spaced apart about a fan rotor,
    said aft fan stage including a row of aft fan blades which are circumferentially spaced apart about said fan rotor,
    a row of variable forward stator vanes located aft of the forward fan blades,
    a casing surrounding said rows of circumferentially spaced apart fan rotor blades and defining at least in part a flowpath for receiving air compressed by said rotor blades, said casing including a bleed port disposed downstream of a row of said blades for receiving a portion of said compressed air as bleed airflow, a bleed duct extending away from said bleed port, said bleed duct including an annular slot in said casing and an annular bifurcated splitter, and said bifurcated splitter having an annular leading edge forebody located upstream of and separated from an annular splitter wall by an annular return channel.

18. An assembly as claimed in claim 17 wherein said leading edge forebody has an airfoil shaped cross-section with a radially outwardly facing suction side and a radially inwardly facing pressure side.

19. An assembly as claimed in claim 18 wherein said leading edge forebody is an annular ring.

20. An assembly as claimed in claim 19 wherein said leading edge forebody is supported by support vanes extending through at least a portion of said bleed duct.

21. An assembly as claimed in claim 18 further comprising at least one bleed plenum in fluid communication with said bleed duct and first and second bleed air circuits in downstream fluid communication with said bleed plenum.

22. An assembly as claimed in claim 21 further comprising a first and second control valves disposed in said bleed circuits downstream of said plenum.

23. An assembly as claimed in claim 22 further comprising a row of variable aft stator vanes located aft of said aft fan blades.

24. An assembly as claimed in claim 17 further comprising a row of variable aft stator vanes located aft of said aft fan blades.

25. An assembly as claimed in claim 24 wherein said leading edge forebody has an airfoil shaped cross-section with a radially outwardly facing suction side and a radially inwardly facing pressure side.

26. An assembly as claimed in claim 25 further comprising at least one bleed plenum in fluid communication with said bleed duct and first and second bleed air circuits in downstream fluid communication with said bleed plenum.

27. An assembly as claimed in claim 26 further comprising a first and second control valves disposed in said bleed circuits downstream of said plenum.

* * * * *